3,184,418
ALUMINOSILOXANE POLYMERS AND METHOD
OF PREPARING SAME
William G. Woods and Marlowe L. Iverson, Anaheim, and Kiyoshi Kitasaki, Garden Grove, Calif., assignors to United States Borax & Chemical Corporation, Los Angeles, Calif., a corporation of Nevada
No Drawing. Filed June 29, 1962, Ser. No. 206,177
4 Claims. (Cl. 260—2)

This invention relates to novel polymers and more particularly, this invention relates to novel aluminosiloxane polymers having good thermal stability, and to methods for preparing such polymers.

It is, therefore, an object of this invention to provide novel aluminosiloxane polymers having good thermal stability.

It is also an object of this invention to provide methods of preparing such polymers.

Other objects will appear from the proceeding description.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

There are provided by this invention polymeric compositions having a molecular weight of at least about 1000 comprising recurring units having the formula

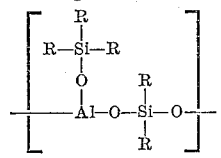

where R represents a benzene ring. The benzene ring preferably is unsubstituted, but can have nuclear substituents which do not interfere with the polymer-forming reaction, as for example, lower alkyl groups and lower alkoxy groups.

The polymers are viscous, to hard glassy resin-like materials having a molecular weight of about 1000 to 2000 or more and they exhibit good stability to hydrolytic attack as well as being thermally stable at temperatures up to about 400° C. They are normally solid resinous materials which soften at a temperature of around 200° C. and they are soluble in the common non-polar solvents, such as benzene, toluene, chloroform, etc. These polymers have utility as surface coatings, giving a clear film when cast from a hydrocarbon solvent. Also, they can be mixed with epoxy type resins and used in fiberglass resin laminates.

The polymers are readily prepared by the pyrolysis of an alkoxy bis(triphenylsiloxy)aluminum as represented by the following equation:

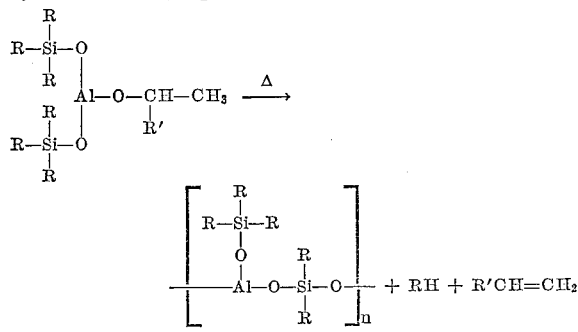

where $n$ is an integer higher than one, R is a benzene ring and R' is hydrogen or a lower alkyl group having 1 to about 4 carbon atoms. It is to be noted that the alkoxy portion of the reactant must have an alpha methyl radical.

The reaction takes place at temperatures of from about 250° to 375° C. in a relatively short period of time. The progress of the reaction is easily followed by the evolution of the by-products, benzene and the alkene, from the reaction mixture. Preferably, the pyrolysis is run under and inert atmosphere such as nitrogen, with the careful exclusion of reactive materials such as oxygen and water. The products are generally viscous, resin-like to hard, glassy polymers having a molecular weight of about 1000 to 2000 or more.

The starting material, alkoxy bis(triphenylsiloxy)aluminum, can be prepared by the reaction of an aluminum alkoxide with triphenylsilanol, as illustrated by the following example of the preparation of isopropoxy-bis(triphenylsiloxy)aluminum.

I. A solution of 51.1 grams (0.25 mole) of freshly distilled aluminum isopropoxide and 138.2 grams (0.50 mole) of triphenylsilanol in 1000 ml. of dry toluene was heated at reflux temperature at a reflux ratio of 30:1. After 4 hours, 44.7 grams of distillate, B.P. 81–109° C., was analyzed by gas chromatography and found to contain 27.6 grams (0.46 mole) of isopropyl alcohol, 4.8 grams (0.06 mole) of benzene and 12.3 grams of toluene. A second fraction B.P. 110° C. (278 ml.) was found to contain a trace of benzene. The remaining solvent was removed in vacuo while heating the flask with an oil bath. After about one-half of the solvent had been removed, a white precipitate settled out of solution. The final solvent fraction, 13.8 grams, was removed with the oil bath at 200° C. and found to contain 0.14 grams (0.0018 mole) of benzene. The white powdery product (151.3 grams) melted at 180–192° C.

Calculated for $C_{21}H_{22}O_2AlSi$, Al=4.24%; mol wt.=636.88. Found in product: Al=4.38%; mol. wt. (cryoscopic in benzene)=890.

The following examples illustrate the preparation of representative polymers of this invention but are not intended to limit the invention to the specific examples given herein.

II. A 10-gram sample (15.7 mmoles) of isoproproxy-bis(triphenylsiloxy)aluminum was pyrolyzed by the following procedure. The sample was weighed into a pyrolysis tube and attached to a vacuum line. The system was flushed with nitrogen, evacuated and then refilled with one atmosphere of nitrogen. The sample was heated by means of a heating bath for 73 minutes at 260° C. and then 67 minutes at 302° C. and the volatile products collected in −78° and −196° C. traps. The by-products were analyzed by infrared spectrometry and gas chromatography and found to contain 5.7 mmoles of propene, 6.3 mmoles of benzene, 0.43 mmole of cumene and 0.17 mmole of isopropyl alcohol. The sample was heated again at a reduced pressure (0.6 mm.) for 8.4 hours at 300° C. to give an additional 7.5 mmoles of propene, 9.1 mmoles of benzene, and 0.65 mmole of cumene. The polymeric residue, which was soluble in benzene, was found to have a molecular weight of 1190 as determined by the cryoscopic method in benzene.

III. An 8.0-gram sample (12.6 mmoles) of isopropoxy-bis(triphenylsiloxy)aluminum was pyrolyzed as in Example II by heating for 142 minutes at 300° C. to give 6.6 mmoles of propene, 6.6 mmoles of benzene, 0.48 mmole of cumene, plus trace amounts of acetone, isopropyl ether and isopropyl alcohol. A second heating period of 38 minutes at 350° C. produced an additional 4.6 mmoles of propene, 8.1 mmoles of benzene and 0.49 mmole of cumene. The polymer, isolated as a benzene soluble residue, had a molecular weight of 1180.

IV. An 8.0 gram sample (12.6 mmoles) of isopropoxy-bis(triphenylsiloxy)aluminum was pyrolyzed as in Example II by heating for 1 hour at 348° C. to give 10.2 mmoles of propene, 15.6 mmoles of benzene, 0.5 mmole of cumene and trace amounts of other products. A second heating period of 2 hours at 350° C. produced an additional 1.0 mmole of propene, 2.8 mmoles of benzene, and 0.07 mmole of cumene. The polymer was isolated as a benzene-soluble residue and found to have a molecular weight of 1380.

Other modes of applying the principle of the invention may be employed, change being made as regards the details described, provided the features stated in any of the following claims or the equivalent of such be employed.

We, therefore, particularly point out and distinctly claim as our invention:

1. A polymeric composition having a molecular weight of at least about 1000, consisting essentially of recurring units of the formula

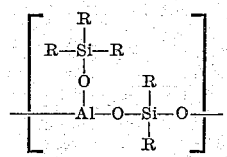

where R represents a phenyl radical, said polymeric composition being soluble in non-polar organic solvents.

2. The method of preparing polytriphenylsiloxy(Al)diphenyl(Si)aluminosiloxane having a molecular weight of at least about 1000 and consisting essentially of the recurring unit

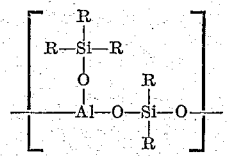

where R represents a phenyl radical, which comprises heating at an elevated temperature in an inert atmosphere a lower alkoxy bis(triphenylsiloxy)aluminum, said alkoxy group having a methyl substituent on the carbon atom bonded to the oxygen atom of said group.

3. The method of claim 2 in which said lower alkoxy bis(triphenylsiloxy)aluminum is heated at a temperature in the range of about 275° to about 375° C.

4. The method of preparing polytriphenylsiloxy(Al)diphenyl(Si)aluminosiloxane having a molecular weight of at least about 1000 and consisting essentially of the recurring unit

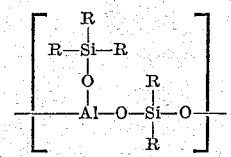

where R represents a phenyl radical, which comprises heating isopropoxy bis(triphenylsiloxy)aluminum at a temperature of about 275° to about 375° C. in an inert atmosphere.

References Cited by the Examiner
UNITED STATES PATENTS
3,061,587  10/62  Rust et al.
OTHER REFERENCES
Chemical Abstracts, vol. 52, 1958, page 14, 217d.

WILLIAM H. SHORT, *Primary Examiner.*
J. R. LIBERMAN, W. H. SHORT, *Examiners.*